June 21, 1960 W. M. McCONNELL 2,941,284
APPARATUS FOR ATTACHING COUPLINGS
Filed Aug. 10, 1954 5 Sheets-Sheet 1
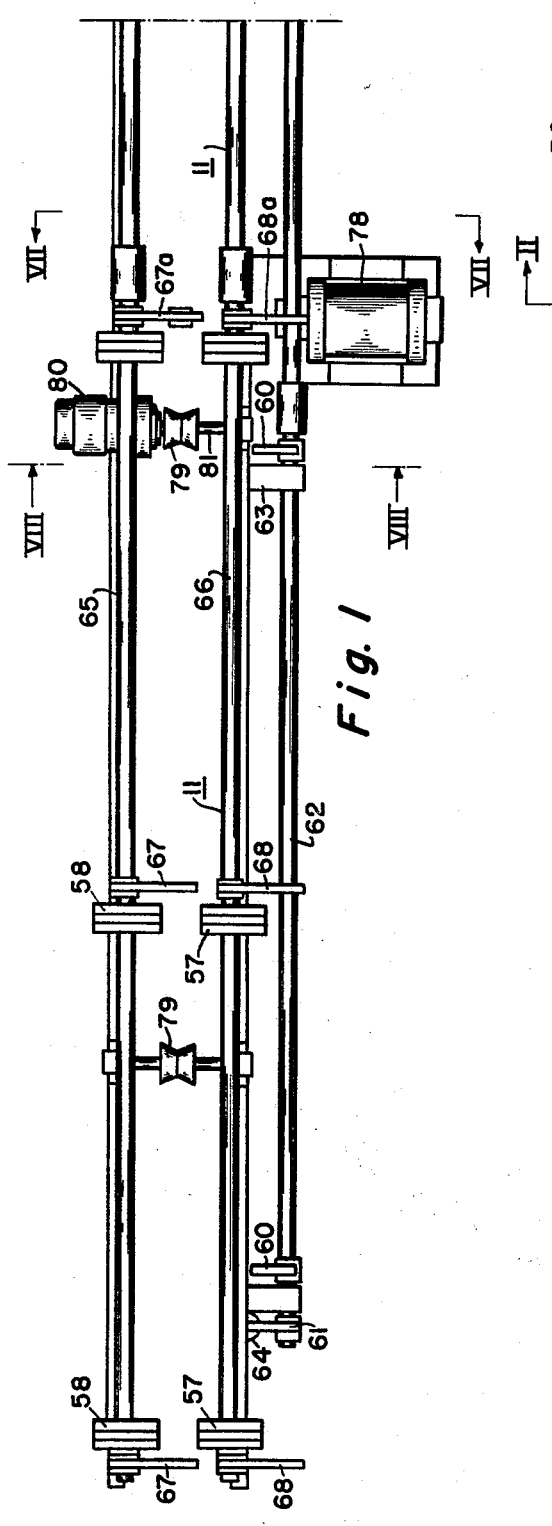
Fig. I
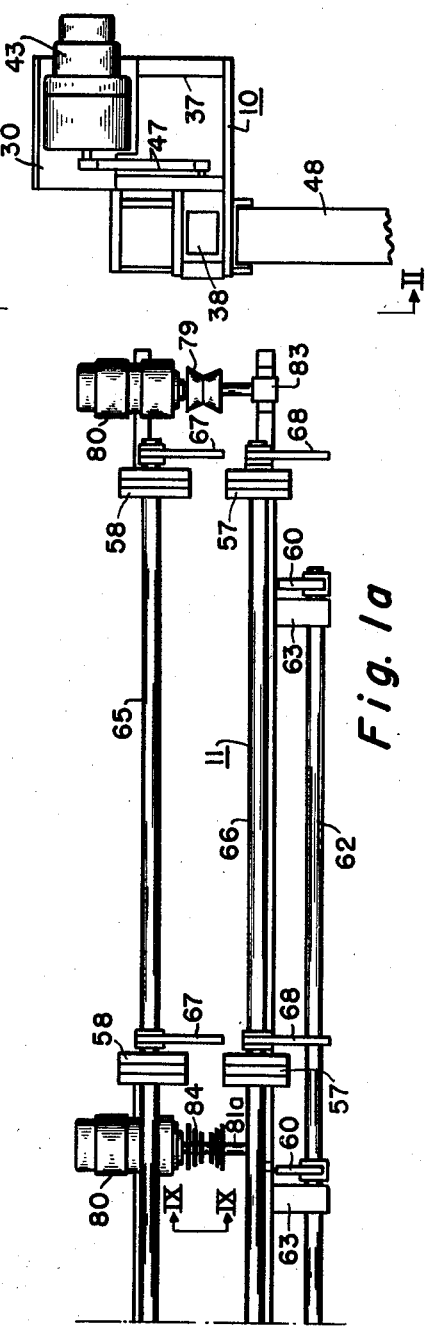
Fig. Ia
INVENTOR.
William Mynard McConnell
BY
HIS ATTORNEYS

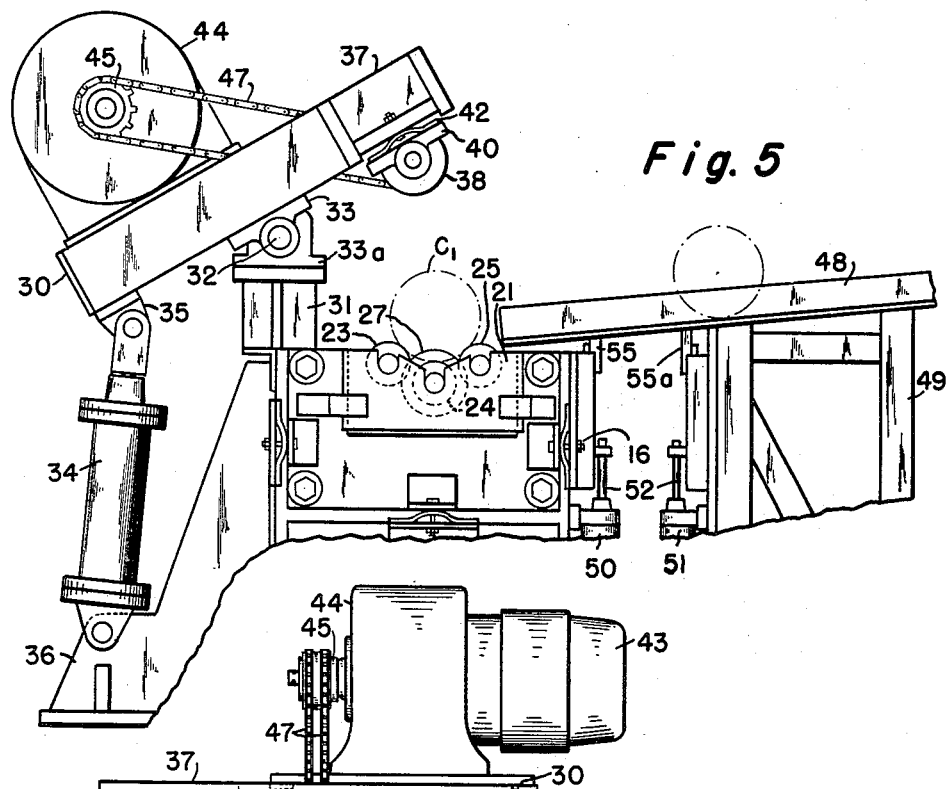
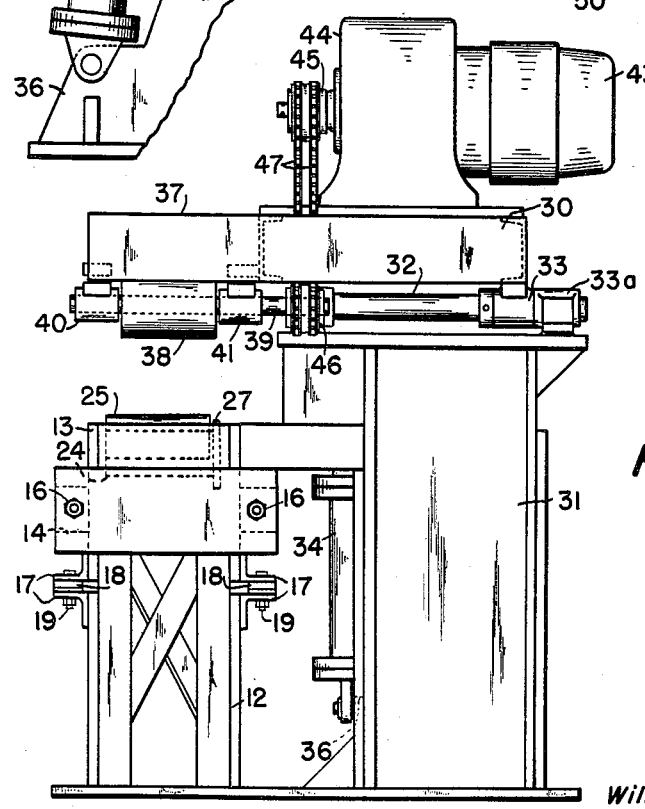
Fig. 5
Fig. 4
INVENTOR.
William Mynard McConnell
BY
HIS ATTORNEYS

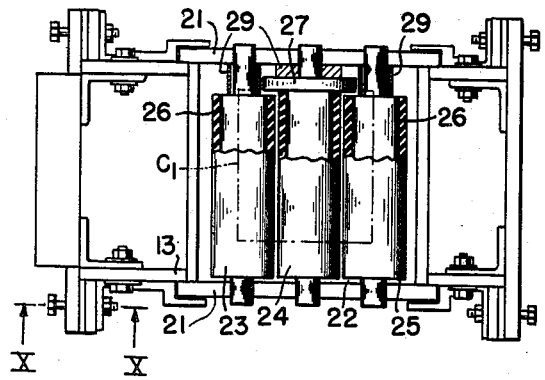
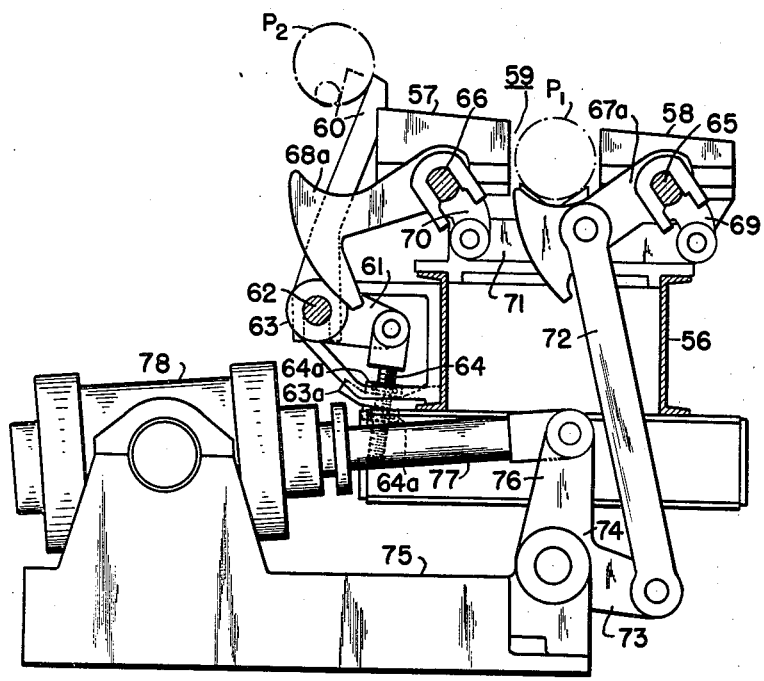
Fig. 6
Fig. 7
INVENTOR.
William Mynard McConnell

June 21, 1960   W. M. McCONNELL   2,941,284
APPARATUS FOR ATTACHING COUPLINGS
Filed Aug. 10, 1954   5 Sheets-Sheet 5

INVENTOR.
William Mynard McConnell
BY
HIS ATTORNEYS

United States Patent Office 2,941,284
Patented June 21, 1960

---

2,941,284

APPARATUS FOR ATTACHING COUPLINGS

William Mynard McConnell, McKeesport, Pa., assignor to Taylor-Wilson Manufacturing Company, Pittsburgh, Pa., a corporation of Pennsylvania Filed Aug. 10, 1954, Ser. No. 448,951

8 Claims. (Cl. 29—240)

The present invention relates to apparatus for attaching a coupling, outside thread protector, or like article to a pipe.

It is the practice in the manufacture and sale of pipe to screw a coupling on at least one end of the pipe before it is shipped so that, at the point of use, it is necessary only to connect successive pipes together. At present the attaching of a coupling is almost always accomplished by hand. Particularly in the case of large heavy couplings, this work is very tiring to operating personnel, and it becomes increasingly difficult over an extended period of time to maintain a desired pace of processing the pipe in an otherwise mechanized handling system, of which the attaching of the coupling may be only one step. For example, the pipe may be also threaded, weighed, measured, and hydraulically tested prior to shipment.

I provide mechanical apparatus for attaching a coupling to a pipe which is safe for operating personnel and constantly maintains the desired pace of processing pipe. In one form, my attaching machine includes a supported frame having rollers on which a coupling rests. A driven roller engages the coupling and thereby rotates it. A pipe advances along a table and into the rotating coupling to effect the attachment. Preferably, the frame is resiliently mounted to permit movement of the frame and the coupling supported thereon with respect to the pipe, so that the coupling is automatically positioned while it is being simultaneously rotated to accommodate an end of the pipe.

The accompanying drawings disclose a presently preferred embodiment wherein:

Figure 1 and its continuation Figure 1a illustrate a plan view of my apparatus for attaching a coupling to a pipe;

Figure 4 is a right-hand end view of Figure 2 with parts removed for purposes of illustration;

Figure 5 is a view similar to that of Figure 2 showing the pivotable platform of the machine in a different position;

Figure 6 is a plan view of the resilient frame of the coupling-supporting machine;

Figure 7 is a section of Figure 1 on the line VII—VII and illustrates apparatus for advancing and ejecting pipe with respect to a table;

Figure 10:
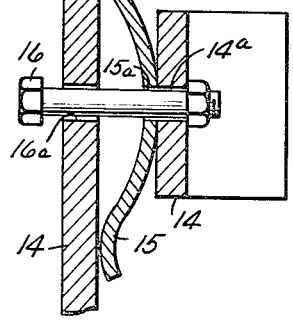
Figure 10 is a section view along the line X—X of Figure 6.

Referring to the drawings, my apparatus includes a machine generally shown at 10 for supporting and rotating a coupling and a table generally shown at 11 for supporting and advancing a pipe to the machine. As shown in Figures 2 through 6, the machine 10 includes a support 12 for a frame 13. At each of the four corners of the frame, the support and frame have registering lugs 14 which are resiliently joined by an interposed curved spring strip 15 and bolt 16 that passes through the lugs and strip. As shown in Figure 10, the bolts 16 extend through slots 14a, 15a and 16a in lugs 14 and spring 15 and are so arranged relative to the lugs that there is play at each of the four corners of the frame 13. A similar construction is used on the ends of the frame 13 where registering lugs 17 of the support and frame are resiliently held together by a spring strip 18 and bolt 19. Figure 10 likewise shows the detailed construction of the lugs 17, spring strip 18 and bolt 19, whereby the frame 13 has play at each of its ends. The resulting resilient mounting of the frame facilitates the attaching of the coupling as hereinafter described.

At each end of the frame 13, holding bars 20 maintain a bearing wall 21 in position on a ledge 22 struck from the frame 13. Parallel idler rollers 23, 24, and 25 are journaled in slots in the walls 21 and preferably have coverings of rubber 26. The walls 21 may be integral with the frame 13 if desired, but usually the walls are removable as described, in order to use different walls to accommodate various clusters or sizes of idler rollers as when couplings of different sizes are used. Roller 24 has a concentric bearing disc 27 which acts as a stop by receiving the thrust of a coupling $C_1$ when it is engaged by a pipe while resting on the frame rollers. The shaft of each roller may also be held against the thrust of a coupling by a spacer 29.

A platform 30 is pivoted to a beam 31 adjacent the support 12 by a pivot shaft 32 journaled at each end in upper pillow blocks 33 and lower pillow blocks 33a. A fluid-operated, double-acting cylinder 34, pivotally connected at opposite ends to a lug 35 of the platform and a flange 36 near the base of the beam 31, pivots the platform. The latter is stationed above the frame 13 and has a framework 37 extending over the rollers 23, 24, and 25. A roller 38, preferably rubber-covered, is carried by the framework on a shaft 39 journaled in bearings 40 and 41. Each of these bearings is resiliently mounted by a curved spring strip 42 through which the bearing is bolted to the framework 37. Preferably, the bolt holes (not shown) which receive the bolts from these bearings are slotted to permit the roller 38 to skew. A motor 43, which may be a torque motor, on the platform 30 drives the shaft 39 and roller 38 through a gear reducer 44, sprockets 45 and 46, and chains 47. Instead of a single roller 38, two or more rollers may be similarly mounted, particularly when couplings of a relatively small diameter are to be attached.

A chute 48 carried by a support 49 directs couplings to the rollers of frame 13. Fluid-operated, double-acting cylinders 50 and 51, fixed to the supports 12 and 49, respectively, release couplings one at a time down the chute. Each cylinder has a piston rod 52 which vertically reciprocates a slide 53 in a guide 54 held by one of the supports 12 or 49. The slides terminate in fingers 55 and 55a which project above the floor of the chute through openings when the piston is in the up position to stop the descent of the couplings. Fingers 55 may be spaced along the slots shown in Figure 3 to accommodate couplings of various diameters.

Referring to Figures 1 and 1a and Figures 7 through 9, the table 11 which supports and advances a pipe to the machine 10 includes a base frame 56 having spaced-apart inlet and outlet skids 57 and 58, respectively, which form a pipe-receiving recess 59 therebetween. Skid 57 slants toward skid 58. Additional skids (not shown) may be used to advance pipe to skid 57 and to receive pipe from skid 58. Arms 60 and 61 are fixed to a shaft 62 which is journaled along the sides of the table in bearings 63. Arm 60 extends above skid 57 to stop the advance of pipe from another skid onto skid 57. Arm 61 pivotally joins an adjusting screw 64 backed on either side of the journal bracket 63a by lock nuts 64a. By adjusting the screw 64 for pipes of different sizes, arm 60 is spaced a desired distance from skid 57 so that lever 68a lifts only one pipe at a time over arm 60, as hereinafter described. A pair of shafts 65 and 66 extend the length of table 11 and pass through skids 58 and 57, respectively, in which they may be journaled. At various points along shafts 65 and 66, there are fixed levers 67 and 68. Levers 67a and 68a are locked in joint rotation by fixed detents 69 and 70 pivotally connected to a link 71. A pitman 72 pivotally joins lever 67a to an arm 73 of a bell crank lever 74 journaled in a base 75. The other arm 76 of the bell crank lever is pivoted to a piston 77 of a fluid-operated, double-acting cylinder 78 which is trunnion-mounted over the base 75.

Figure 3:
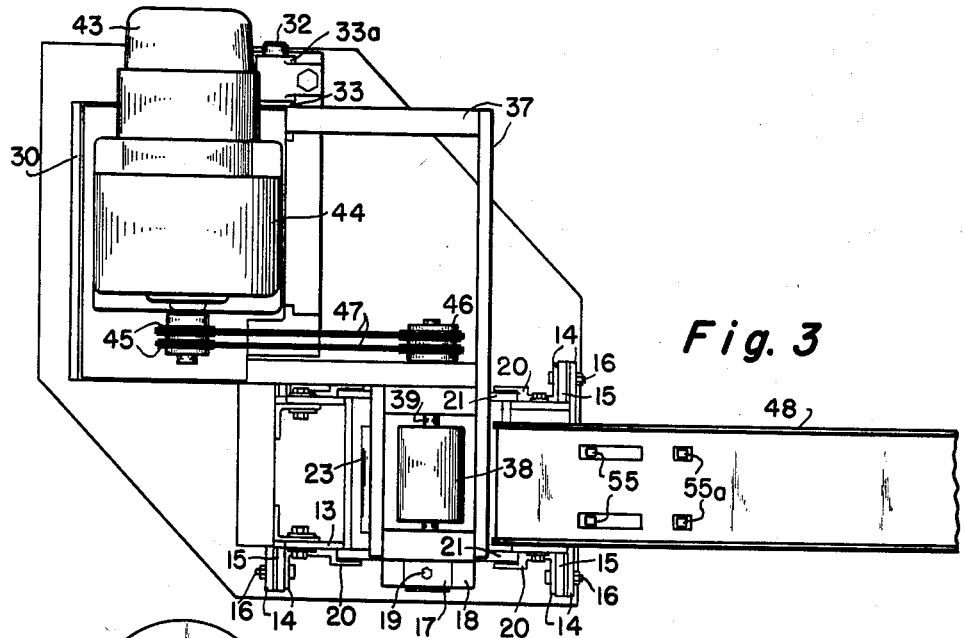
Figure 3 is a plan view of the machine of Figure 2.
Figure 2:
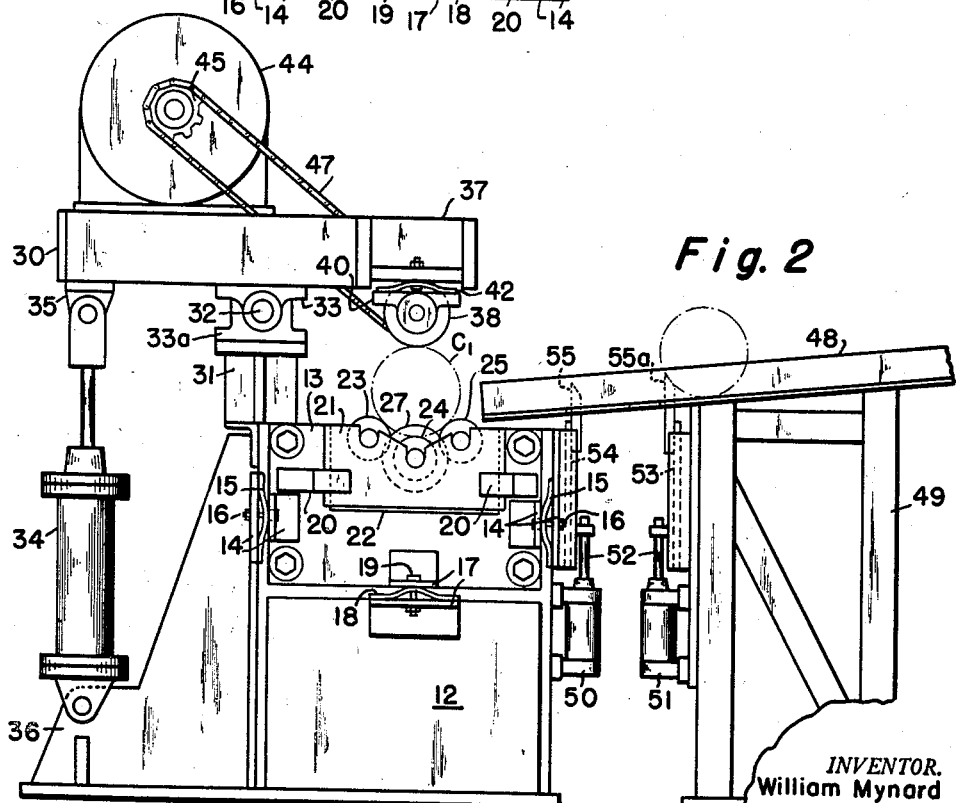
Figure 2 is a section of Figure 1a on the plane of the line II—II and shows a machine for supporting and rotating a coupling.
Figure 8:
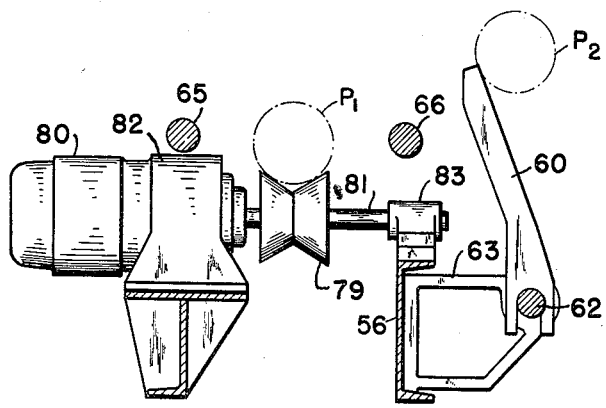
Figures 8 and 9 are sections of Figures 1 and 1a, on the lines VIII—VIII and IX—IX, respectively, and show rollers which may be used with the table.
Figure 9:
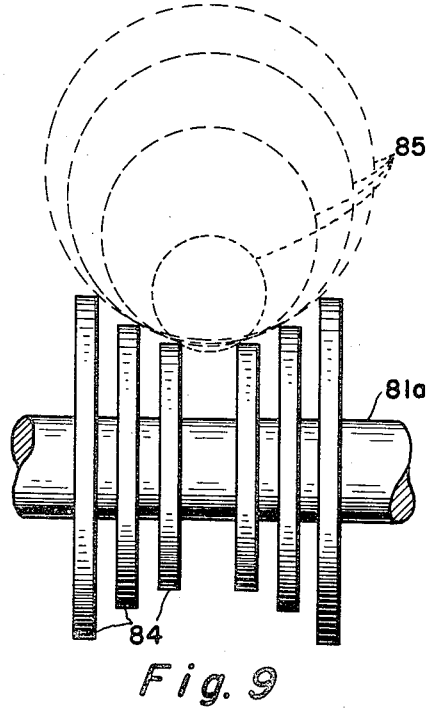

V-shaped rollers 79 are mounted transversely of the table to receive and center the pipe. At least some of the rollers are driven, as shown in Figure 8 by a reversible torque motor 80 which rotates a roller shaft 81 through a gear reducer 82 and which may be safely stalled in accordance with general practice. The shaft 81 is journaled at its free end in a bearing 83 on the other side of the pipe-receiving recess 59. To insure that the pipe does not rotate in the table, at least one of the V-shaped rollers, as illustrated in Figure 9, preferably comprises discs 84 uniformly spaced on a shaft 81a and having uniformly increasing diameters toward the ends of the shaft. As illustrated by the dotted circles 85, regardless of the size of pipe used, the pipe rides on at least two of the discs 84. The discs make a slight bite into the pipe which is insufficient to mar the surface but sufficient to resist rotation.

In operation, the platform 30 may initially be in a raised position as shown in Figure 5, and the motors 80 stalled by the presence of pipe $P_1$ to which a coupling has been previously attached. The motors 80 are reversed to back the pipe and coupling away from the rollers 23, 24, and 25. Cylinder 78 is then operated to raise both levers 67a and 68a by means of the pitman 72 and link 71 and then quickly return the levers to their original positions. This action also turns the shafts 65 and 66 so that the levers 67 and 68 are similarly operated. Levers 67 and 67a lift pipe $P_1$ (Figure 7) remaining in the recess 59 from a previous operation, and sends the pipe down skid 58. Levers 68 and 68a lift pipe $P_2$ having a threaded end over the arm 60 down skid 57 and into the recess 59.

Meanwhile, a coupling $C_1$ is placed on the rollers 23, 24, and 25. To this end, cylinder 51 is operated to lower the finger 55a and permit the couplings to roll against finger 55. Finger 55a is now raised and cylinder 50 operated to lower finger 55, so that the first coupling may roll onto the frame rollers while finger 55a retains the remaining couplings. Motor 43 is started and cylinder 34 operated to pivot platform 30, thereby engaging the driven roller 38 with coupling $C_1$ and rotating it.

Upon receipt of pipe $P_2$ in the recess 59, the torque motors 80 are again reversed and advance the threaded end of pipe $P_2$ toward the rotating coupling $C_1$ by the rollers 79. Upon engagement, the coupling is screwed onto the threaded end of the pipe with a maximum force determined by the frictional contact of the roller 38 with the coupling $C_1$, and the motors 80 once again stall. The weight and mass inertia of the length of the pipe aided by the disc roller of Figure 9 overcome any tendency of the pipe to turn. The resilient mounting of frame 13 and roller 38 have been found to greatly facilitate this operation. Should the pipe not strike the coupling directly on center or should the pipe have a slight camber, the rotating coupling tends to shift vertically or horizontally or even assumes a skewed axial direction so as to seat its internal threads over the external threads of the pipe. In this way the coupling is automatically positioned to accommodate the pipe end. The same is true of the resiliently mounted roller 38 with respect to a freedom of movement whether horizontally, vertically, or in a skewed direction, which is best suited to engage and rotate the coupling.

The use of rubber coverings on rollers 23, 24, 25, and 38 has been found to provide an excellent control in the attaching operation. Not only are the pipes protected against marring, but there is such excellent frictional contact between these rollers and the coupling that controlling and positioning the coupling are easily accomplished. In some instances, there is such frictional contact between the rollers and the coupling that the thrust of a pipe against the coupling does not even move it against the bearing disc 27. After the coupling is attached, cylinder 34 is operated to pivot the platform 30 away from the pipe and coupling. Thereafter the cycle as described is repeated.

The operation of cylinders such as 34, 50, 51, and 78 may be individually accomplished in a conventional manner, or these operations may be automatically synchronized by the use of limit switches and standard time-delay circuits.

Motor 43 may also be reversible in order to unscrew a previously attached coupling and inspect the threads. Instead of couplings, the present apparatus may also be used to attach outside thread protectors which are applied on the threaded end opposite the coupling. The thread protectors are similar to short couplings and may be made of either steel or plastic.

While the foregoing disclosure describes a presently preferred embodiment, it is understood that the invention may be practiced in other forms within the scope of the following claims.

I claim:

1. In apparatus for attaching threaded couplings to threaded lengths of pipe having a table to receive the lengths of pipe and having means disposed on the table to support the pipe along its length and to advance it toward an end thereof for threading of a coupling on an end of the pipe, the combination comprising a frame disposed at the end of said table, resilient mounting means interposed between said frame and a support for resiliently mounting the frame upon said support, a plurality of rollers journaled in the frame and adapted to receive the coupling thereon for substantial alignment with a length of pipe, an arm having a roller mounted thereon, said arm being so positioned relative to said frame that when a coupling rests upon the frame rollers it is engaged by the roller mounted on said arm, and means for rotating at least one of said rollers whereby a coupling lying on said frame rollers is rotated about its central axis, said resilient mounting means permitting the coupling axis to be automatically brought into alignment with the axis of the pipe during the threading operation.

2. In apparatus for attaching threaded couplings to threaded lengths of pipe having a table to receive the lengths of pipe and having means disposed on the table to support the pipe along its length and to advance it toward an end thereof for threading of a coupling on an end of the pipe, the combination comprising a frame disposed at the end of said table, resilient mounting means interposed between said frame and a support for resiliently mounting the frame upon said support, said resilient mounting means permitting said frame to shift in vertical, horizontal, lateral and skewed directions, a plurality of rollers, journaled in the frame and adapted to receive the coupling thereon for substantial alignment with a length of pipe, a pivotally mounted arm having a roller mounted thereon, means for pivoting said arm to engage the roller with and to withdraw it from a coupling lying on said frame rollers, and means for rotating at least one of said rollers whereby a coupling lying on said frame rollers is rotated about its central axis, said resilient mounting means permitting the coupling axis to be automatically brought into alignment with the axis of the pipe during the threading operation.

3. The combination of claim 1 characterized by the roller mounted on the arm having a resilient mounting.

4. The combination of claim 1 characterized by said resilient mounting means being disposed between the sides of said frame and said support and between the ends of said frame and said support.

5. The combination of claim 1 characterized by said resilient mounting means being springs.

6. In apparatus for attaching threaded couplings to threaded lengths of pipe having a table to receive the lengths of pipe and having means disposed on the table to support the pipe along its length and to advance it toward an end thereof for threading of a coupling on an end of the pipe, the combination comprising a frame disposed at the end of said table, resilient mounting means interposed between said frame and a support for resiliently mounting the frame upon said support, said resilient mounting means permitting said frame to shift in vertical, horizontal, lateral and skewed directions, a plurality of rollers journaled in the frame and adapted to receive the coupling thereon for substantial alignment with a length of pipe, said frame having means to receive the axial thrust of the coupling, a pivotally mounted arm having a roller mounted thereon, means for pivoting said arm to engage the roller mounted thereon with and to withdraw it from the coupling lying on the frame rollers, and means for rotating at least one of said rollers whereby a coupling lying on said frame rollers is rotated about its central axis, said resilient mounting means permitting the coupling axis to be automatically brought into alignment with the axis of the pipe during the threading operation.

7. In apparatus for attaching threaded couplings to threaded lengths of pipe having a table to receive the lengths of pipe and having means disposed on the table to support the pipe along its length and to advance it toward an end thereof for threading of a coupling on an end of the pipe, the combination comprising a frame disposed at the end of said table, resilient mounting means interposed between said frame and a support for resiliently mounting the frame upon said support, said resiliently mounting means permitting said frame to shift in vertical, horizontal, lateral and skewed directions, a plurality of rollers journaled in the frame and adapted to receive the coupling thereon for substantial alignment with a length of pipe, a pivotally mounted platform, a roller mounted on the platform, means for pivoting said platform to engage the roller mounted thereon with and to withdraw it from a coupling lying on said frame rollers, and means for driving said platform roller whereby a coupling lying on said frame rollers is rotated about its central axis when said coupling is engaged by said arm roller, said resilient mounting means permitting the coupling axis to be automatically brought into alignment with the axis of the pipe during the threading operation.

8. In apparatus for attaching threaded couplings to threaded lengths of pipe having a table to receive the lengths of pipe and having means disposed on the table to support the pipe along its length and to advance it toward an end thereof for threading of a coupling on an end of the pipe, the combination comprising a frame disposed at the end of said table, resilient mounting means interposed between said frame and a support for resiliently mounting the frame upon said support, said resilient mounting means permitting said frame to shift in vertical, horizontal, lateral and skewed directions, a plurality of rollers journaled in the frame and adapted to receive a coupling thereon for substantial alignment with a length of pipe, an arm having a roller mounted thereon, said arm being so positioned relative to said frame that when a coupling rests upon the frame rollers, it is engaged by the roller mounted on said arm, means for rotating at least one of said rollers whereby a coupling lying upon said frame rollers is rotated about its central axis, said resilient mounting means permitting the coupling axis to be automatically brought into alignment with the axis of the pipe during the threading operation, and at least one of said means for supporting and advancing said pipe being a rotatable shaft mounted transversely relative to the length of pipe, said shaft mounting a plurality of different diameter disks spaced thereon, said disks being arranged along said shaft according to an increasing diameter progression from the center towards the ends of said shaft, each of said disks having an edge about its periphery so that the disk bites into said pipe and resists thereon rotation of said pipe about its longitudinal axis.

References Cited in the file of this patent
UNITED STATES PATENTS

| | | |
|---|---|---|
| 1,386,585 | Berry | Aug. 2, 1921 |
| 1,763,927 | Ireland | June 17, 1930 |
| 1,765,825 | Cork | June 24, 1930 |
| 2,426,095 | Hecker | Aug. 19, 1947 |
| 2,449,059 | Costello | Sept. 14, 1948 |
| 2,526,900 | Remington | Oct. 24, 1950 |
| 2,559,703 | Bergman | July 10, 1951 |
| 2,627,772 | Wharton | Feb. 10, 1953 |
| 2,639,497 | Stouffer | May 26, 1953 |
| 2,756,490 | Sawdey | July 31, 1956 |
| 2,763,236 | Cummings | Sept. 18, 1956 |

FOREIGN PATENTS

| | | |
|---|---|---|
| 563,436 | Germany | Nov. 9, 1932 |